United States Patent Office 3,508,935
Patented Apr. 28, 1970

3,508,935
CELLULOSIC LACQUERS AND PRINTING INKS
Douglas J. Bridgeford, Danville, Ill., assignor to
Tee-Pak, Inc., a corporation of Illinois
No Drawing. Continuation-in-part of applications Ser. No.
200,621, June 7, 1962, and Ser. No. 416,795, Dec. 8,
1964. This application Dec. 8, 1966, Ser. No. 600,060
The portion of the term of the patent subsequent to
Aug. 27, 1985, has been disclaimed
Int. Cl. C09d 11/14
U.S. Cl. 106—26                    12 Claims

ABSTRACT OF THE DISCLOSURE

A novel printing ink or lacquer is prepared by admixture of a dye or pigment, including finely divided metallic pigments, with a decausticized solution of sodium cellulose xanthate or other analogous polymeric alcohol xanthates. The decausticized xanthate solution with which the dye or pigment is mixed is preferably prepared by dialysis or ion exchange reaction or by combinations of dialysis and ion exchange or in some cases weak acid neutralization under carefully controlled conditions. The decausticized xanthate solution may be used as is or may be spray dried to produce a stable powder capable of storage for extended periods of time. The spray dried powder may be re-dissolved in water to reconstitute a decausticized xanthate solution with which the pigment or dye may be mixed. Also, the decausticized solution may be mixed with a pigment or dye prior to spray drying and a stable powder obtained which will produce the desired lacquer or printing ink upon re-dissolving and/or dispersing in water. The composition which is produced by admixture of a dye or pigment and a decausticized polymeric alcohol xanthate solution is regenerable by heat or by treatment with acid. It is preferred to merely dry the solution as a lacquer or imprint on the desired substrate and regenerate the polymeric alcohol binder film in the course of the drying operation.

CROSS-REFERENCE TO RELATED APPLICATIONS

This application is a continuation-in-part of the copending applications of Douglas J. Bridgeford, Ser. No. 200,621 filed June 7, 1962, now U.S. Patent No. 3,291,789, and Ser. No. 416,795 filed Dec. 8, 1964, now U.S. Patent No. 3,399,069.

BACKGROUND OF THE INVENTION

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation byproducts.

In commercial production, viscose is allowed to age until it reaches the desired ripeness and is then extruded through a die into a coagulating and/or regenerating medium (e.g., ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film or regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In my copending patent application, Ser. No. 200,621, filed June 7, 1962, there are described several inexpensive processes for decausticizing various polymeric alcohol xanthates. In that patent application there are described processes in which alkaline solutions of various polymeric alcohol xanthates are decausticized by dialysis or by treatment with ion exchange or ion retardation materials.

Solutions of polymeric alcohol xanthates which have been decausticized as described in my prior copending patent application are especially useful in the preparation of lacquers and printing inks as described in this specification. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in my copending patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

In the preparation of viscose and other polymeric alcohol xanthates, many undesired byproducts are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In my copending patent application, Ser. No. 200,621, it is reported that polymeric alcohols, principally film-forming carbohydrates or polyscaccharides, such as cellulose, starch, amylose, dextran, etc., in the form of their caustic xanthate solutions, can be decausticized by dialysis, a weak acid neutralization, ion exchange, and/or ion retardation. The various procedures for decausticization of various xanthate solutions are described in considerable detail in that patent application.

In my copending patent application, Ser. No. 416,795, I have reported that decausticized solutions of polymeric alcohol xanthates, such as cellulose, starch, amylose, dextran, sugars, polyvinyl alcohol, polyallyl alcohol, etc., can be converted to finely divided, solid, stable products by spray drying. The decausticized solutions (which have been decausticized to a pH less than 13) are subjected to spray drying using a large volumn of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

I have found that the dry decausticized xanthate powders which can be prepared in this manner can be dissolved in water in admixture with dyes or pigments to produce novel lacquers and printing ink compositions.

It was most unexpected that decausticized xanthate solutions could be spray dried. Viscose is much more stable on extended storage, both at low and elevated temperatures, than is a solution of decausticized cellulose xanthate of the same cellulose content. I have found viscose, however, to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up-flow countercurrent type, vertical down-flow concurrent type, and vertical up-flow concurrent type, although other commercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high as 316° C. to 420° C.

It should be noted that even where high air temperatures are used the temperature surrounding each particle being dried is approximately the wet bulb temperature of the drying gas and thus the product is not subjected to temperatures substantially above the boiling point of water.

It is therefore one object of this invention to provide a new and improved lacquer of printing ink composition which is regenerated by drying with or without application of heat.

Another object is to provide a new and improved lacquer or printing ink composition which is highly adherent to paper, plastic film, and other substrates and is resistant to water.

A feature of this invention is the provision of a new and improved lacquer or printing ink composition comprising a solution of a decausticized polymeric alcohol xanthate containing a dye or pigment admixed therewith.

Still another feature of this invention is the provision of an improved lacquer or printing ink composition comprising a solution of a polymeric alcohol xanthate prepared by dissolving a powder obtained by spray drying a decausticized polymeric alcohol xanthate solution in water in admixture with a dye or pigment.

Still another feature of this invention is the provision of a water soluble spray dried decausticized polymeric alcohol xanthate powder containing a dye or pigment in admixture therewith and dispersible into the solution upon dissolving of the powder in a suitable solvent.

Other objects and features of this invention will become apparent from time to time throughout the specification and claims as hereinafter related.

SUMMARY OF THE INVENTION

This invention comprises a new and improved lacquer or printing ink composition consisting essentially of a solution of a decausticized polymeric alcohol xanthate containing a pigment or dye in admixture therewith. The decausticized xanthate solutions which are used may be prepared as described in the aforementioned co-pending patent applications or may be solutions which are reconstituted from the spray dried decausticized xanthate powders. The xanthate solutions may be aqueous solutions or solutions of the decausticized xanthate materials in nonaqueous solvents which are not reactive with the xanthates or the dyes or pigments admixed therein. In particular, the decausticized xanthate solutions are especially effective in making ink or lacquer compositions wherein the dye or pigment of the ink or lacquer is of a type that would be reactive with the excess alkali in the xanthate solutions if the caustic were not removed therefrom. The decausticized xanthate solutions are also especially effective in the manufacture of printing inks and lacquers which are to be applied to substrates which are attacked by concentrated alkali.

DESCRIPTION OF PREPARATION OF DECAUSTICIZED XANTHATE MATERIALS USED IN THE PREPARATION OF NOVEL PRINTING INKS AND LACQUERS

The following nonlimiting examples are illustrative of the preparation of the decausticized xanthate solutions and spray dried decausticized xanthate powders, as described in the aforementioned copending patent applications, which materials are used in the preparation of novel printing inks and lacquers in accordance with this invention.

Example 1

A commercial viscose solution is purified by a batch dialysis technique and converted to a decausticized, dry, stable powler by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglycose groups per cellulose molecule).

The viscose is diluted to a 4% cellulose content and 600 ml. of the dilute viscose is placed in a bag of regenerated cellulose film. The dialysis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hr. period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decausticized (pH 11), viscose is obtained. The decausticized viscose is fed through a commercial mixed flow spray dryer. The solution is atomized into the dryer and contacted with a high velocity heated air. In this drying operation the air inlet temperature is 130° C. and the air outlet temperature is 60° C. the rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. The product which is obtained has a xanthate sulfur content of about 12.5% on cellulose and a D.P. which is substantially the same as the viscose feed stock. The dry powdered product is stable against xanthate decomposition for several days at room temperature and almost indefinitely when refrigerated to 0° C. The product has a pH less than 13 when dissolved or dispersed in water at 1% concentration and a D.S. greater than 3%.

In this example aged or ripened viscose was used. In other experiments unaged or unripened, blender viscose was used with similar results. In fact, when blender viscose is used, both the feed and product xanthate sulfur contents are higher and the produce more easily redissolved in water. If desired, the process can be carried out with specially prepared high xanthate viscose, having a xanthate D.S. in the range from 50 to 100% (i.e., 1.5 to 3.0 xanthate groups per anhydroglucose unit).

Example 2

In another experiment, the dialysis of viscose was carried out using an acid form cation exchange resin to maintain a high concentration gradient through the dialysis membrane to reduce the quantities of water required for the dialysis. A 60-in. long tube of regenerated cellulose was tied at one end to form an elongated bag. At the end of the bag was placed about 20 g. Amberlite I.R.C. 50H (a carboxylic exchange resin in the acid form) and 50 ml. of water. The casing was then tied and additional amounts of water and ion exchange added and the bag again tied. This arrangement was repeated until a string of five batches of resin and water were obtained. This dialysis membrane containing acid form cation exchange resin beads was then placed in a wide mouth bottle containing 500 g. of viscose having a 4% cellulose content, produced by dilution of 8% cellulose content commercial blender viscose. The bottle was stoppered and shaken at 320 cycles per min. for 2½ hours. The shaker bed was maintained at a temperature of about 32° C. When the dialysis was complete, the dialysis membrane was removed from the bottle and the decausticized viscose solution which remained had a pH of 11.4. The dialyzed viscose which was thus produced was a viscous liquid of just barely pourable viscosity. The increase in viscosity was partially caused by decausticization but was also due to a ripening of the diluted viscose as a result of being held at a temperature of 32° C.

The procedure just described is repeated and the product diluted to produce about 5 gallons of 2% cellulose content solution. The decausticized viscose solution is fed into a commercial concurrent down flow type spray dryer. The decausticized viscose is atomized into the dryer and mixed with heated air. The air inlet temperature is 146° C. and the outlet temperature 107° C. As previously described, the evaporation of water from the atomized droplets of viscose maintains the surface temperature of the droplets sufficiently low to prevent excessive decomposition of the cellulose xanthate.

The product which is obtained is a finely divided, dry (moisture content less than about 5%), stable, solid. The individual particles are spherical in shape and have an average diameter of about 10 microns. The product has a xanthate sulfur content of about 15% on cellulose and is easily dissolved in water. This product is stable for several days at room temperature and almost indefinitely under refrigeration.

The solid, stable, finely divided sodium cellulose xanthate produced in Examples 1 and 2 is easily dissolved in water to produce a solution which can be used for a variety of purposes. The reconstituted solution can be regenerated as a film or filament by conventional acid treatment or by thermal decomposition. The solution can be admixed with any pigment or dye which is not chemically reactive therewith to produce a printing ink or lacquer composition. The printing ink or lacquer composition may be applied to any suitable substrate and the cellulose regeneratted by application of heat to produce a film of regenerated cellulose which is dyed or pigmented.

Example 3

In this and subsequent examples, the preparation of various spray dried polymeric alcohol xanthates is described.

A high purity amylose (derived from corn) containing about 10% water and having a D.P. of about 700–900 is used in the formation of an alkali amylose xanthate solution similar to viscose.

An alkaline solution of 24% concentration (1580 g. water and 300 g. sodium hydroxide) was prepared and mixed with 300 ml. methanol and 150 g. amylose. The slurry which was formed was stirred for 10 min. and 200 ml. additional methanol added, and the more dilute slurry stirred for 1 hr. at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize or age.

The alkali amylose which was produce was dried and aged for 43 hrs. at 25° C. to permit the preparation of relatively high concentration alkali amylose xanthate solutions. The gel weight was about 870 g. and comprised 12.6% alkali, 16% amylose and 71% water.

The alkali amylose (870 g.) was spread on the bottom and on the porcelain plate of a 12 in. vacuum desiccator. Nitrogen purging was carried out and a vacuum was then applied. About 70 g. of carbon disulfide was drawn into the desiccator and the system allowed to stand in a water bath at 25° C. After about 5.25 hrs., the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hrs. using a 2½ in. marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a commercial down-flow counter-current-type spray dryer. The amylose xanthate solution is sprayed into the dryer counter-currently tot he flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry, solid comprising essentially decausticized sodium amylose xanthate. The product consists of very small, hollow spheres ranging from submicron size up to balloons in the range of 30 to 60 microns in diameter and has an average particle size in the range of 5 to 20 microns.

This product has an xanthate sulfur content equal to about 75% of the xanthate sulfur content of the feed solution. The amylose xanthate powder is easily dissolved in water to produce viscous solutions which are useful in the formation of regenerated amylose films and fibers. The reconstituted amylose xanthate solutions are also useful in the preparation of printing ink or lacquer compositions by admixture of a dye or pigment with the solution preferably in admixture with an oxidant to cross link the regenerated amylose film produced on drying. The powdered amylose xanthate product is stable for extended periods of time. If the powder is given an additional drying with extremely dry air at room temperature or by admixture with a desiccant material to reduce the water content to substantially zero there is substantially no loss of xanthate sulfur during storage at room temperature for several months.

Example 4

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November, 1960, p. 68ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a commercial concurrent up-flow spray dryer. The solution is atomized into the dryer into a stream of heated air. The air has an inlet temperature of about 163° C. and an outlet temperature of 104° C. Under these conditions the spray is converted to a finely-divided dry powder and recovered in the product collection system.

The sodium polyvinyl alcohol xanthate powder consists of hollow spherical particles ranging from submicron size to balloons having diameters of the order of 30 to 60 microns. The powder is stable on extended storage and is easily redissolved in water. A reconstituted solution of decausticized sodium polyvinyl alcohol xanthate is a viscous liquid which can be regenerated as a film or fiber and which is useful in the preparation of printing inks and lacquers by admixture of a dye or pigment therewith.

Example 5

In this example, dilute sodium polyallyl alcohol xanthate is decausticized and converted to a dry stable powder.

The sodium polyallyl alcohol xanthate used in this example is prepared in accordance with the procedure of B. G. Ranby, described in Die Makromolekulare Chemie, November, 1960, p. 68ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a commercial horizontal concurrent flow type dryer. The solution is atomized into the dryer into a stream of heated air. The air has an inlet temperature of about 163° C. and an outlet temperature of 104° C. Under these conditions the spray is converted to a finely divided powder and recovered in the product collection system.

The sodium polyallyl alcohol xanthate powder is finely divided and consists of hollow spherical particles ranging from submicron size to balloons having diameters of the order of 30 to 60 microns. The powder is stable on extended storage and is easily redissolved in water. A reconstituted solution of decausticized sodium polyallyl alcohol xanthate is a viscous liquid which can be regenerated as a film or fiber and which is useful in the preparation of printing inks and lacquers by admixture of a dye or pigment therewith.

SPRAY DRYING OF XANTHATE SOLUTIONS DECAUSTICIZED BY CATION EXCHANGE

Viscose and analogous polymeric alcohol xanthate solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g., Zeo-Karb 215, Zeo-Karb 315, Amberlite IR 1, Amberlite IR 100, Duolite C 10, Duolite C 3, Dowex 30; sulfonated polystyrenes, e.g., Zeo-Karb 225, Amberlite IR 120, Duolite C 20, Dowex 50, and Nalcite HCR; sulfonated coal, e.g., Zeo-Karb H 1; nuclear sustituted phosphonate resins, e.g., Duolite C 60 and Duolite C 61; Carboxylic resins, e.g., Zeo-Karb 216, Zeo-Karb 226, Amberlite IRC 50, Duolite CS 100; acid treated zeolites; naturally occurring nonresinous ion exchange materials, e.g., cellulose, wood fibers (bast fiber) including fabricated forms thereof such as webs, papers, fabrics, and the like. The reference to ion exchange material of the high capacity resinous type, to liquid ion exchangers, and to naturally occurring nonresinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali) the resulting solution has a pH less than 13 and is capable of being spray dried as will be subsequently described. When a polymeric alcohol xanthate solution is decausticized to a pH less than about 9 some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acids) of the specified polymeric alcohol in which some or all of the combined alkali has been removed.

The following nonlimiting examples are illustrative of the preparation of stable, dry powders of polymeric alcohol xanthates by spray drying of xanthate solutions which have been neutralized or decausticized by cation exchange.

Example 6

An 8% cellulose content viscose, as used in Example 1, was diluted with distilled water to a 0.5% cellulose content. Amberlite IRC 50H resin beads were added intermittently to the diluted viscose with mechanical stirring over a period of about 10 min. at 25° C. until the pH reached a value of about 8. A clear, light-amber colored liquid resulted. The liquid was filtered through a muslin filter cloth and had a viscosity of 5.1 cp. at high shear rates and 7.8 cp. at low shear rates. When the solution is decausticized to pH 6-7 and spray dried substantially all of the non-xanthate sulfur is removed as $H_2S$, $CS_2$ etc.

The decausticized viscose, prepared as described above, is fed into a concurrent or parallel flow, up-flow type spray dryer. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The xanthate sulfur content of the product is about 75% of that of the feed to the dryer. The drying operation results in a very slight loss of xanthate sulfur but produces a dry, stable powder which can be stored for extended periods of time at room temperature and almost indefinitely under refrigeration. The sodium cellulose xanthate powder is easily redispersed in water to form a sodium cellulose xanthate solution from which films or fibers can be regenerated or which may be used in the preparation of printing inks or lacquers by admixture or reaction of dyes or pigments therewith.

Example 7

In an additional series of experiments, viscose containing higher proportions of cellulose was treated with a cation exchange resin by passing the viscose through a column of resin designed for pressure operation. The column consisted of a 2 in. (O.D.) x 30 in. stainless steel tube provided with end caps having O-ring seals and 100 mesh stainless steel screens backed by 14 mesh screens for supporting the resin bed. In using the column, coarse glass wool was first placed over the screen and the bottom of the column. A portion of Amberlite IRC 50H resin was pretreated with water to prevent excessive compacting of the resin due to swelling on initial wetting. The moist resin was added to the column and tamped to minimize channeling during the ion exchange reaction.

In one experiment the column was partially filled with 150 g. of Amberlite IRC 50H resin. 600 g. of 2% cellulose content viscose was added to the column. The pressure on the column was gradually increased to 30 p.s.i.g. over about 5 min. 600 g. of decausticized viscose was eluted from the column in 3 min. after the pressure reached 30 p.s.i.g. The initial effluent from the column had a pH of 5.5. The final effluent from the column had a pH of about 8.4 which increased to 9.0 after about 4 hrs. of storage.

In another experiment the column was charged with 100 g. of Amberlite IRC 50 H covered with a 0.75 in. layer of Amberlite IRC 50 Na. Next, 547 g. of 3% cellulose content viscose was introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hrs. at 25° C.

In another experiment a column was charged with 100 g. of Amberlite IRC 50 H covered with a 0.5 in. layer of Amberlite IRC Na. Then 700 g. of 2.5% cellulose content viscose was added to the column and a pressure of 55 p.s.i.g. applied. The entire 700 g. of viscose was eluted from the column in about 4.5 min. and had a pH of 12.5.

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described in Example 6, above. The viscose solution, in each case, is atomized into a stream of heated air. The air stream has inlet temperature of about 149° C. and an outlet temperature of about 104° C. As previously described, the evaporation of water from the individual droplets of solution maintains the surface temperature of the droplets (and the resulting solid particle) at a temperature not substantially in excess of the wet bulb temperature of the gas stream. The spray drying of the decausticized viscose solutions produces finely divided powders of sodium cellulose xanthate. The powder is a dry (moisture content less than about 3%) stable, solid material in the form of hollow spheres having diameters ranging from submicron size up to 60 microns in diameter. The dry solid product is stable for several days at room temperature and almost indefinitely under refrigeration. If the dry powder is dried further to remove substantially all of the water, the product can be stored almost indefinitely at room temperature.

The sodium cellulose xanthate powder produced as just described is easily dissolved in water to reconstitute a decausticized viscose solution. The solution thus prepared is mixed with suitable dyes or pigments to produce novel printing ink and lacquer compositions.

Example 8

In another experiment, a 0.8% cellulose content viscose was mixed with Dowex 50 WX8 sulfonic acid type resin in the hydrogen ion or acid form. The mixture was stirred for a few minutes and the decausticized solution recovered. The solution had a pH of 11.5 and did not coagulate or gel after storage for 24 hrs. at room temperature.

When this solution is spray dried as described in the previous example, a solid stable powder is obtained which is easily redissolved in water at the time and place of intended use.

Example 9

The composition of viscose (or similar polymeric alcohol xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange to produce cellulose xanthic acids (also called cellulose acid xanthates), the resulting product will hydrolyze to produce additional amounts of free alkali. However, this hydrolysis takes time and the composition of the resulting product, therefore, varies somewhat with the time required for the neutralization or ion exchange. The composition of the decausticized viscose also depends to some extent upon the time that it has been stored.

In a series of experiments, a 0.5% cellulose content viscose was neutralized or decausticized by treatment with Amberlite IRC 50 H resin and samples obtained in a pH range from 9.3 down to 6.5.

Analysis of the decausticized viscose having a pH of 6.9 showed that the composition contained about 57% of its xanthate content in the form of acid xanthate groups. At a pH of 7.3 the viscose contained 56% of its xanthate content in the form of acid xanthate groups. Viscose which was decausticized to a pH of 8.1 was found to contain 17% of its xanthate content in the form of acid xanthate groups. On the other hand, viscose which was decausticized to a pH of 9.3 contained no free acid xanthate groups.

When the decausticized viscose samples taken at various pH levels are spray dried in the dryer described in Example 6, above, a stable, solid sodium cellulose xanthate powder is obtained.

In each case there is a slight loss in xanthate sulfur content of the product relative to the feed. This results from a partial decomposition of the xanthate. The viscose samples which correspond to viscose having all free alkali removed (pH of about 9.3) are spray dried most efficiently with a minimum decomposition of the xanthate. Viscose which has been neutralized to a lower pH is somewhat less stable and is preferably dried using higher velocity and lower temperature air. Viscose samples which have been neutralized to a pH in the range from 9.3 up to 13 are progressively less stable, with increasing pH of the solution, during the spray drying process. This is unexpected since the opposite is true with respect to the neutralized solutions. The solutions decrease in stability with decrease in pH below pH 13.

In this range (pH 9–13), there is a more severe loss of xanthate sulfur. Nevertheless, with proper selection of temperature and air velocities in the spray dryer, spray dried products can be produced which are solid, stable and easily redissolved. Viscose, and other polymeric alcohol xanthate solutions having a pH above 13 cannot be spray dried without almost total loss of xanthate sulfur. In fact, attempts to dry viscose and other polymeric alcohol xanthates having a pH above 13 results in almost total regeneration of the cellulose or other polymeric alcohol therefrom. In such a case, the powdered product which is produced cannot be redissolved or redispersed and is lacking in all of the desirable properties found in the spray dried decausticized product.

Example 10

This example demonstrates that naturally occurring organic ion exchange materials can be used with substantially equal success in decausticizing viscose in preparation for drying.

An 8% cellulose content viscose as used in Example 1 was diluted in a 0.3% cellulose content with distilled water. The diluted viscose was slurried with bast fibers which had been acid treated to convert the ion exchange sites therein to the acid or hydrogen ion form. At the end of 10 min., the slurry was filtered and the dilute viscose was recovered as a light amber colored solution of cellulose xanthate having a pH of about 9.0.

The decausticized viscose thus prepared is fed into a spray dryer as described in Example 6 above. In the dryer the viscose is atomized and passed into a stream of heated air. The air has an inlet temperature of 143° C. and an outlet temperature of 104° C.

The viscose spray is completely dried to produce a finely divided solid product which is stable on extended storage. The product is sodium cellulose xanthate in the form of hollow spheres ranging from submicron size up to balloons in the range of 30 to 60 microns in diameter.

Example 11

A series of experiments were carried out in spray drying decausticized viscose under a variety of feed conditions. Viscose having a 7.7% cellulose content was decausticized to various pH levels in the range from about 6.5 to 12.3 using Amberlite IRC 50 ion exchange resin in the acid or hydrogen ion form. The decausticized viscose was diluted to a 2% cellulose content and spray dried in a dryer of the type described in Example 6 above.

The spray dried powders obtained in each of the runs contained about 65% cellulose and about 4% water. The product was a free flowing powder which is stable for several weeks at temperatures just below room temperature. Under refrigeration the powder is stable almost indefinitely. The sodium cellulose xanthate powder is very hygroscopic and must be protected against atmospheric moisture. The powders obtained in the various runs were further dried using various laboratory desiccants and also by extensive drying with bone dry air. Extensive drying with bone dry air has reduced the water content of the product to substantially less than 1%. The stability of the product is closely related to water content. The product tends to lose xanthate sulfur in the presence of moisture. The extremely dry product has a storage life of about six months or more at room temperature. In fact, the totally anhydrous product is stable even at moderately elevated temperatures for extended periods of time.

When various solid extender materials are mixed into the decausticized viscose prior to spray drying the resulting product consists of particles of solid cellulose xanthate dried on nuclei formed of the extenders. Pigments, sizing agents, dyes, anti-static agents, clays, etc., can be admixed with the decausticized viscose feed to produce a spray dried product containing the extender material. Kaolin clays have been mixed with decausticized viscose at clay: cellulose ratios of 0.5–2.0 to 1.0 and spray dried. The solid product was redispersed and/or dissolved in water and used to coat paper with no loss in strength relative to paper coated with the same cellulose loading but containing no clay. Likewise, the spray dried product may be admixed with pigments, buffers, antioxidants, sizing agents, dyes, antistatic agents, desiccants, cross linkers for cellulose, solid acids and the like.

Example 12

An 8% amylose content solution of sodium amylose xanthate is prepared as described in Example 3, diluted to a 2% amylose content, and neutralized and decausticized by contact with an ion exchange resin in the acid form. Decausticized solutions of sodium amylose xanthate are produced in this manner at pH values ranging from 10.5 down to 7.6 or lower.

Decausticized solutions of sodium amylose xanthate prepared as described above are spray dried in a manner described in any of the previous examples. The solutions are preferably atomized into a stream of heated air having an inlet temperature of 143° C. and an outlet temperature of 102° C. The product obtained is a dry, stable, decausticized sodium amylose xanthate powder.

Example 13

A dilute solution of sodium polyvinyl alcohol xanthate is prepared as described in Example 4, decausticized to a pH of 8.0 by admixture with a cation exchange resin in the acid form, and spray dried as in the previous example. The product is a dry, stable powder of sodium polyvinyl alcohol xanthate and is easily dissolved or dispersed in water.

Sodium polyallyl alcohol xanthate solution is prepared as described in Example 5, decausticized, and spray dried as described above for the preparation of spray dried sodium amylose xanthate.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used is a strong-base or intermediate-base strength anion exchange resin in the salt form (nonhydroxide form). When the viscose (or other xanthate) solution is contacted with an anion exchange resin in the salt form, the hydroxide groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating byproducts such as trithiocarbonates, mono- and dithiocarbonates, thiosulfates, perthiocarbonates, and sulfides which are produced as byproducts in the xanthation process.

The treatment of viscose and similar solutions with anion exchange resins has the advantage of removing ionic byproducts which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: intermediate base anion exchangers, e.g., Dowex 2; strong base anion exchangers, e.g., De-Acidite FF, Amberlite IRA 400, Amberlite IRA 410, Dowex 1, Nalcite SAR; porous anion exchangers, e.g., Decolorite and Duolite S30, as well as naturally occurring anion exchangers, e.g., proteins containing ionizable amino groups, polymeric betaines, etc.

The following non-limiting examples are illustrative of the decausticization of polymeric alcohol xanthates by anion exchange:

Example 14

A glass column having an I.D. of 1 cm. was filled to a depth of 20 cm. with 50 mesh Dowex 1X4 ion exchange resin in the chloride form.

An 8% cellulose content viscose was diluted to 0.5% cellulose content and fed through the column under a pressure of 0.5 p.s.i.g. at a rate of 1 ml./min. The effluent from the column had a substantially constant pH of 11.8 and was a clear, colorless liquid.

This procedure was repeated using the same apparatus filled with Dowex 1X8 resin in the chloride form and the product was a clear liquid having a substantially constant pH of 11.8.

The decausticized viscose produced as just described is fed through a spray dryer as described in Example 6.

The solution is atomized into a heated air stream having an inlet temperature of 115° C. and an outlet temperature of 60° C. The product obtained is a dry stable almost white powder comprising sodium cellulose xanthate containing a small amount of sodium chloride.

When dilute viscose was passed through an anion exchange column using other anion exchange resins, including Dowex 2X4 (chloride form), Amberlite IRA 400 (nitrate form), and Nalcite SAR (nitrate form), a decausticized product was obtained as described above.

When the decausticized product is spray dried, the resulting product is a dry stable white powder containing a small amount of a sodium salt impurity resulting from the introduction of the anion from the exchange resin. The anion exchange step is particularly effective in removing colored sulfur byproducts. These colored byproducts can also be removed by aeration of a cold solution which has been purified or decausticized by dialysis or cation exchange.

When the above procedure is repeated using solutions of sodium amylose xanthate, sodium polyvinyl alcohol xanthate, or sodium polyallyl alcohol xanthate, the solutions are readily decausticized and can be spray dried as described above.

SPRAY DRYING OF POLYMERIC ALCOHOL XANTHATE SOLUTIONS DECAUSTICIZED BY ION RETARDATION

Ion retardation resins constitute a new class of materials similar to ion exchange resins. They are prepared by polymerizing a cationic monomer inside the pores of an anion exchange resin or an anionic monomer inside the pores of cationic exchange resin. The resulting linear polymer is trapped inside the cross-linked ion exchange resin and cannot diffuse out. The resin system is physically and chemically stable and comprises a mixture of cation and anion exchangers with the mixing taking place at the molecular level.

In an ion retardation resin the ionic and cationic absorption sites are so closely associated that there is a partial neutralization of electrical charges in adjacent sites. However, the sites still have an attraction for mobile anions and cations and can associate with them to some extent. The result is that the resin will absorp both anions and cations from solutions with which it comes in contact, but the absorbed ions can be displaced from the resin by the use of water as an eluent. If the solution contains macromolecular ions, they cannot, in general, diffuse inside the resin beads, so a separation of small from large anions can take place. Ion retardation resins may be utilized in batch operations. However, since absorbed ions are only weakly held, their removal from solution is incomplete even in the presence of excess resin, and hence a column operation is generally preferred. In column operations, the solution to be treated is fed through the resin bed until the ion absorbing capacity of the bed is utilized as completely as possible. The absorbed ions are then eluted by rinsing the bed with water.

Example 15

In one experiment, a column of ion retardation resin was prepared using Retardion 11A8 (product of the Dow Chemical Company) which is a 50–100 mesh resinous material prepared by polymerizing acrylic acid inside Dowex 1 (a quaternary, strong base, styrene resin manufactured by the Dow Chemical Company). Before use, the resin was soaked in water to remove soluble impurities and to cause the resin to expand to its wet size. The preliminary washing of the resin is desirable to bring the resin bed to its full size and thus prevent variation in feed rate through the bed.

An 8% cellulose content (6% alkali) viscose was diluted to a 1% cellulose content for removal of alkali in the column. The dilute viscose was introduced into the top of the column and allowed to flow through by gravity. The eluent from the column had a pH of about 12 and was a clear colorless liquid. At a pH of 12, more than 99.9% of the free alkali in the viscose has been removed.

The recovery of the dilute viscose from the column was essentially quantitative and the decausticized product, substantially free of impurities, could be thermally regenerated into a coating or film.

When this decausticized solution is fed into a spray dryer as described and shown in FIG. 1, a spray-dried product is produced which is stable over extended periods of time. The dilute solution is fed into the dryer through the atomizing nozzle into an air stream having an inlet temperature of 121° C. and outlet temperature of 60° C. The fine spray is quickly dried to produce a dry powder which is rapidly separated from the heated air before substantial decomposition of the xanthate can occur. The powder which is produced can be redissolved or redispersed in water or other substantially inert polar solvents and can be used in solution in admixture with dyes or pigments to produce novel printing ink and lacquer compositions.

Example 16

A column of Retardion 11A8 resin is prepared as described in Example 15. An 8% amylose content solution of sodium amylose xanthate is prepared as described in Example 3 and diluted to a 1% amylose content solution. The dilute amylose xanthate solution is then allowed to flow by gravity through the resin bed. The effluent from the column has an average pH of about 12, which would represent substantially complete removal of all free alkali in the solution.

When this solution of decausticized sodium amylose xanthate is spray-dried using the dryer described in Example 6 a fine powder is obtained which is stable for extended periods of time at room temperature and almost indefintely under refrigeration. The product can be redissolved or dispersed in water or other inert polar solvent and used as an adhesive or a wet-dry strength additive in the manufacture of paper.

SPRAY-DRYING OF VISCOSE AND OTHER POLYMERIC ALCOHOL XANTHATE SOLUTIONS DECAUSTICIZED BY LIQUID ION EXCHANGERS

In some cases, the use of a liquid ion exchanger is advantageous in continuously decausticizing viscose (or other polymeric alcohol xanthate solutions) because the liquid exchange medium can be continuously removed and regenerated.

Example 17

A liquid ion exchanger was prepared by dissolving 20 g. of monolauryl acid orthophosphate in 50 ml. of carbon tetrachloride. A turbid dispersion was produced. A 250 ml. beaker was charged with 100 ml. of dilute (0.5% cellulose content) viscose and the liquid ion exchanger slowly added with stirring.

As the materials were mixed, spontaneous emulsion took place and the pH decreased slowly to pH 9. The mixture was centrifuged to break the emulsion and decausticized viscose (pH 9) recovered as a clear, amber liquid.

When viscose which has been decausticized using a liquid ion exchanger as above described is fed into a spray dryer as described in Example 6 above, a dry, stable powder is obtained. The solution is atomized into a heated air stream having an inlet temperature of 116° C. and an outlet temperature of 60° C. The dry powdered product is stable for extended storage at room temperature and almost indefinitely under refrigeration.

When the dry powder is redissolved to reconstitute a decausticized viscose solution, the resulting solution can be mixed with a dye or pigment to produce a printing ink or lacquer which can be regenerated into dyed or pigmented cellulosic film coatings or imprints.

The liquid ion exchange process used in decausticizing the viscose in preparation for spray-drying can be similarly used in the decausticizing of other polymeric alcohol xanthates. Other liquid ion exchangers (both anion and cation type), well known in the art, can be used in this process.

SPRAY-DRYING OF VARIOUS POLYMERIC ALCOHOL XANTHATE SOLUTIONS DECAUSTICIZED BY VARIOUS MULTI-STEP PROCESSES

While the several processes of dialysis, cation exchange, anion exchange, ion retardation, etc., described above, are effective in decausticizing polymeric alcohol xanthate solutions, these processes are effective and in some cases more efficient when used in conjunction with one another. Thus, cation and anion exchange resins can be used for sequential treatment of various xanthate solutions, and mixtures of resins in the form of a mixed bed can similarly be used. Also, a combination of dialysis with cation or anion exchange is especially effective in decausticizing the various polymeric alcohol xanthate solutions. The decausticized solutions prepared by any such process can be spray-dried to produce exceptionally stable dry powdered materials.

Example 18

A 4% amylose-content, amylose xanthate solution was prepared as described in Example 3. About 100 g. of solution was placed in a regenerated cellulose bag and dialyzed by shaking the bag in 1.5 liter of water in a polyethylene bottle at 320 cycles per minute. The water was changed twice at 20-minute intervals; then it was changed again and the system left standing at 25° C. overnight.

The amylose xanthate solution was recovered from the dialysis bag as a viscose liquid having a pH of 11.5. The dialyzed solution (pH 11.5) recovered from the dialysis bag was mixed with Amberlite IRC 50H resin to removed additional sodium ions therefrom. The solution was separated from the exchange resin and found to have a pH of 6.5.

When the dialyzed and ion exchanged solution is spray-dried in the apparatus described in Example 6 above, using an air inlet temperature of about 127° C. and an outlet temperature of 66° C., a stable, solid, dry powder is obtained.

When the spray-dried powder is redissolved, a reconstituted amylose xanthate solution (pH 6.5) is obtained which is quite viscous and can be mixed with dyes or pigments to produce pigmented or dyed solutions which can be regenerated to produce pigmented or dyed films or imprints.

Example 19

A 1% cellulose content viscose was subjected to dialysis as described in Examples 1 to 3 produce a decausticized product having a pH of about 12. The decausticized viscose was then mixed with a cation exchange resin, Amberlite IR 120H, to further remove sodium ions therefrom. The solution which was removed from admixture with the resin was a viscous, light-amber-colored solution of decausticized cellulose xanthate having a pH of about 6. When this decausticized cellulose xanthate is spray-dried as described in Example 18, a dry, stable powder is obtained. As previously described, the spray-dried powder may be redissolved to produce a solution which may be admixed with dyes or pigments to produce novel printing ink or lacquer compositions.

Example 20

A 1% cellulose content viscose is subjected to dialysis as described in Examples 1 to 3 to produce a decausticized product having a pH of about 12. The decausticized viscose is then mixed with a cation exchange resin, Zeo-Karb 226, to further remove sodium ions therefrom. The solution which is recovered from admixture with the resin is a viscous, light-amber-colored solution of decausticized celluose xanthate having a pH of about 6.

When this decausticized cellulose xanthate is spray-dried as described in Example 18, a dry, stable powder is obtained. As previously described, the spray-dried powder may be redissolved to produce a solution which may be admixed with dyes or pigments to produce novel printing ink and lacquer compositions.

Example 21

A 0.5% cellulose content viscose solution, freshly diluted, is fed through a column of Dowex 1X4 resin in the chloride form. A colorless effluent is recover from the column having a pH slightly in excess of 12. The sulfur byproducts in the viscose are removed in the form of a carrot-colored band near the top of the resin bed.

The effluent from the anion exchange column is then passed through a column containing Amberlite IRC 50H cation exchange resin to yield a colorless, odorless effluent. The solution recovered from the cation exchange column has an initial pH of 7.6.

When the pH 7.6 solution is spray-dried as described in Example 18, there is produced a stable, dry powder. This powder can be redissolved in water to produce a cellulose xanthate solution free of alkali and sulfur byproducts which can be admixed with dyes or pigments to produce novel printing inks or lacquers which can be thermally regenerated.

Example 22

A 1% cellulose content viscose solution, freshly diluted, is neutralized to pH 10 by admixture with Amberlite IRC 50H resin. The mixture is filtered to recover a fawn colored solution of cellulose xanthate.

The cation exchanged solution is then mixed with Dowex 1X4 anion exchange resin for a period of about 10 minutes. The solution which is recovered from the anion exchange resin is clear, colorless, and odorless, having a pH of about 10. The color-forming and odor-forming impuritites are removed during the anion exchange treatment.

When the product solution is spray-dried as described in Example 18, there is produced a stable, dry, solid product. The dry powder which is produced is stable for extended periods of time at room temperature and almost indefinitely under refrigeration. As described in the previous examples, the spray-dried decausticized cellulose xanthate can be redissolved to produce solutions which may be admixed with dyes or pigments to produce novel printing ink and lacquer compositions.

Example 23

In another experiment, a mixed bed ion exchange resin was prepared by mixing about 15 g. of Amberlite IRC 50H cation exchange resin with 13 g. of Dowex 1XOH anion resin. The mixed resin was added to 150 ml. of 1% cellulose content diluted viscose and stirred for ten minutes. The supernatant solution which was recovered was a clear, colorless solution having a pH of 7.2.

When this solution is spray-dried as described in Example 18, a dry, solid powder is obtained which is stable for extended periods of time at room temperature and almost indefinitely under refrigeration. As previously described, the spray-dried cellulose xanthate powder may be redissolved to produce a solution which may be admixed with dyes or pigments to produce novel printing ink or lacquer compositions.

DESCRIPTION OF THE INVENTION

Decausticized viscose and other decausticized polymeric alcohol xanthates are useful for a variety of purposes for which the caustic containing materials would have little or no application. The decausticization of polymeric alcohol xanthate solutions reduces considerably the formation of byproduct materials upon regeneration of the polymeric alcohol. The decausticized xanthate solutions are especially useful in that they can be regenerated thermally to produce products which are largely free of byproduct materials. The xanthate solutions can be used in the preparation of lacquer and printing ink compositions containing dyes or pigments which would be destroyed by chemical reaction with the alkali present in ordinary caustic containing xanthate solutions, or which would be destroyed or discolored by the acid used in conventional acid regeneration of polymeric alcohols from xanthate solutions. The printing ink or lacquer compositions which are prepared in accordance with this invention comprise a vehicle comprising a decausticized xanthate solution produced as described in the various examples above (either the decausticized xanthate solutions per se or the solutions reconstituted from powders obtained by spray drying of decausticized xanthate solutions) in admixture or in chemical combination with dyes or pigments and may include an epoxy or isocyanate adhesive. The amount of dye or pigment in the composition is not critical and is selected fully for the desired coloring effect. The dyes or pigments may be used in amounts ranging from a very small percent based on the polymeric alcohol content of the solution up to several hundred percent of the polymeric alcohol content. Likewise, where an epoxy or isocyanate adhesive is included in the composition the minimum amount required to promote adhesion is used.

Example 24

For purposes of camparison, an experiment was carried out in which an attempt was made to prepare a silver colored lacquer by incorporation of a finely divided aluminum powder into ordinary viscose. When aluminum powder was dispersed into a viscose solution (8% cellulose, 7% sodium hydroxide) there was a rapid chemical reaction. The solution bubbled vigorously and hydrogen was evolved as the aluminum powder dissolved in the alkali. From this experiment it is apparent that alkali sensitive pigments or dyes can not be used in the preparation of printing inks or lacquers from ordinary viscose. A similar problem is encountered when attempts are made to prepare lacquers or printing inks from other plastic solutions of polymeric alcohol xanthates.

Example 25

A lacquer composition was prepared by mixing 0.3 g. of aluminum powder with 160 g. of a 1% solution of decausticized cellulose xanthate (pH 8.5) for 5 minutes. The decausticized cellulose xanthate was prepared by reconstituting a solution from the spray-dried product as described above. Similar compositions were prepared using a cellulose xanthate solution prepared by decausticizing a viscose solution by ion exchange or by dialysis. When a film was cast as a thin layer and dried at 100° C. in an oven or at 85° C. in a convection oven, a bright silver-colored film was obtained.

The aluminum pigmented decausticized cellulose xanthate solution was used as a lacquer coating on regenerated cellulose film. The regenerated cellulose film was coated with the aluminum pigmented solution and dried. The regenerated cellulose film was thus coated with a silver-colored lacquer finish which had excellent adhesion and rub resistance both under wet and dry conditions. The aluminum pigmented solution was also applied to a tissue paper and to a sized white bond paper to produce silver-colored lacquer coated paper products. The adhesion of the pigmented coating and the rub resistance of the coating were excellent both under wet and dry conditions.

This use of decausticized solutions of cellulose xanthate to act as a binder for alkali sensitive pigments or dyes or for other pigments, provides a strong, high-wet-rub-resistant coating. The pigmented or dyed solutions may be used either as lacquers or coating or at high dye and pigment loadings may be used as printing inks.

Example 26

A printing ink or lacquer composition was prepared using Alcoa Grade 408, 325-mesh aluminum pigment. Two grams of the aluminum pigment was mulled in water with 20 ml. of a 2% cellulose concentration solution of decausticized sodium cellulose xanthate. The sodium cellulose xanthate solution was prepared from a spray dried powder obtained from a viscose which was decausticized by cation exchange. The sodium cellulose xanthate had a D.P. of 375 and a xanthate sulfur content of 15% based on the cellulose. The reconstituted solution had a pH of 9. Approximately 10 drops of Rohm and Haas Triton X100 was used as a wetting agent. After adequate wetting, the slurry was added to a 2% cellulose solution of pH 9 cation exchange decausticized viscose having a cellulose content of 10 grams, making a pigmented dope containing 20% aluminum pigment based on cellulose content.

The aluminum pigmented dope was applied to a variety of substrates as a lacquer coating. The dope was applied with a No. 40 Meyer rod to cellophane film, regenerated cellulose sausage casings, fibrous paper reinforced meat casings, 3-oz. cotton muslin, and a wool flannel. Each of the above substrates were then dried in air and then cured for about 2 minutes at 100° C. to insure complete regeneration of the cellulose. The coated substrates were rinsed in water to remove soluble by-products of the cellulose regeneration. The silver or aluminum colored coating on the substrates was tightly adherent and had a high wet rub adhesion.

While the wet rub adhesion of these pigmented coatings on cellulose films was good even after immersion in 80° C. water for 30 minutes, it was possible to improve it further by addition of adhesion promoters. Adhesion promoters which may be used include isocyanate adhesives, preferably aliphatic diisocyanates, and epoxy-containing polymers such as Kymene 557. One of the most desirable adhesion promoters is an emulsion of General Mills DDI 1410 dimer acid-derived $C_{36}$ aliphatic diisocyanate. This diisocyanate is emulsified into the dope by adding it drop-wise to the dope in a Waring Blendor in an amount of about 5–10% based on the weight of the cellulose. When this improved dope was used the aluminum pigmented cellulose adhered so well to the substrates that in most cases it could not be scraped or rubbed off the wet regenerated cellulose films without damage to the film. In particular, where the improved dope was used in coating fibrous casing, the coated casing could be immersed in water at 100° C. for one hour and the film could neither be scraped nor rubbed free from the substrate without severe damage to the casing film.

Example 27

Another experiment was carried out using a different aluminum pigment specifically recommended for use in aqueous media and giving rise to a more brilliant, better dispersed and more opaque film at a given pigment loading. The pigment used was Alcoa Albron Products, Standard Litho Powder No. 552. This pigment was used at a 20% concentration based on the weight of contained cellulose and was added to a 2% cellulose concentration dope made as described in Example 26. Approximately 0.01% Igepal 630 was also added to assist in dispersion of the pigment in the decausticized sodium cellulose xanthate solution. The same adhesion promoter, General Mills DDI, was used at a loading of 5% based on cellulose content of the dope. This mixture was stirred at high speed in a Heller high shear mixer for 10 minutes to obtain a good silvery dispersion. The dope was coated with a No. 40 Mayerrod on the substrate listed in Example 26. In this case also excellent wet rub and excellent wet scratch adhesion of the pigmented film to the substrates was obtained with a considerably higher brilliance and better opacity.

In some cases, where decausticized cellulose xanthate solutions are used which have not been decausticized to a low enough pH to effect sulfur byproduct removal, there is a slight yellow tinge produced in the regeneration of the cellulose lacquer film. If desired, this slight yellow tinge can be eliminated so that pure silver or aluminum colored pigmented films are formed by mere heating, without the necessity of a subsequent wash or rinse to remove byproducts. This can be done by adding a masked acid to the dope. One of the better masked acids is diammonium citrate. The addition of a concentration of 0.2–0.8% of this material to the dope generates enough acid during the drying of the pigmented coatings so that the final film is essentially neutral and the sulfur containing byproducts are evolved as gases during the drying or curing of the substrate.

Example 28

Printing inks and lacquer compositions are prepared by incorporating dyes or pigments in solutions of decausticized cellulose xanthate (and the other decausticized cellulose xanthate (and the other decausticized polymeric alcohol xanthates) whereby cellulosic coatings or imprints may be produced on any suitable substrate. The solutions used may range in cellulose content from about 0.1% to 10% or higher. The pH of the solution is less than about 13, although solutions having a pH of about 7 to 9 are preferred. Any nonreactive pigments may be incorporated into the solution. Especially useful are pigments which would otherwise be reactive with the alkali present in viscose, such as aluminum powder, zinc powder zeolites, etc. Other nonreactive pigments, such as vat pigments, naphthol pigments, $TiO_2$, carbon black, etc. may be used. Also, dyes may be incorporated into the solution which will dye the cellulose (or other polymeric alcohol) upon regeneration of the xanthate from solution. Cellulose direct dyes are especially useful, such as Chrysophenine G, Durazol Red 2B, Chlorzol F, Orange G, etc. These dyes and pigments may be admixed with the decausticized sodium cellulose xanthate solutions in an amount sufficient to produce the desired coloring or pigmenting effect. The dyes and pigments may be present in concentrations ranging from 0.01% up to 1,000% or higher based on the cellulose content of the lacquer or printing ink.

The lacquers or printing ink compositions which are produced in accordance with this invention are applied to any suitable substrate, such as fabric, paper, regenerated cellulose sausage casings (including fibrous paper-reinforced casings), wood, plastic, metal, etc., and the coating or imprint regenerated by drying, preferably with a mild application of heat, although drying at room temperature will cause the coating or imprint to be fixed over a longer period of time. The dyed or pigmented coating or imprint which is produced is a cellulosic film (or film of other polymeric alcohol) containing the desired dye or pigment. The film is quite adherent to a large variety of materials. If desired, a small proportion of an additional adhesive material, such as a diisocyanate or polyisocyanate or poly epoxide, may be used as a primer coat before treatment with the printing inks or lacquers of this invention or adhesives may be incorporated into the printing ink or lacquer composition to promote adhesion of the pigmented or dyed film to the substrate.

While this invention has been described fully and completely with special emphasis upon certain preferred embodiments it should be understood that within the scope of the appended claims the invention may be practiced otherwise than as specifically described herein.

What is claimed is:

1. A coating composition comprising a coloring agent selected from the group consisting of dyes, pigments, and mixtures thereof admixed with a vehicle comprising a solution of a polymeric alcohol xanthate, said vehicle xanthate solution being produced by redissolving a dry powder produced by spray drying a decausticized polymeric alcohol xanthate solution having a pH of less than 13, said vehicle being substantially free of xanthation reaction byproduct salts.

2. A coating composition in accordance with claim 1 in which the coloring agent is a pigment.

3. A coating composition in accordance with claim 2 in which the pigment is a metal powder.

4. A coating composition in accordance with claim 2 in which the pigment is aluminum powder.

5. A coating composition in accordance with claim 2 in which the pigment is titanium dioxide.

6. A coating composition in accordance with claim 2 in which the pigment is finely divided carbon.

7. A coating composition in accordance with claim 1 in which the coloring agent is a dye for the polymeric alcohol upon regeneration thereof.

8. A coating composition in accordance with claim 1 in which the coloring agent is a dye for the polymeric alcohol and is chemically combined therewith.

9. A coating composition in accordance with claim 1 in which the xanthate solution comprising said vehicle is reconstituted from a dry powder produced by spray drying a decausticized viscose, amylose xanthate, starch xanthate, polyvinyl alcohol xanthate, or polyallyl alcohol xanthate solution.

10. A coating composition in accordance with claim 11 wherein said decausticized solution is a decausticized solution of sodium cellulose xanthate and said coloring agent is a pigment.

11. A coating composition in accordance with claim 11 wherein said decausticized solution is a decausticized solution of sodium cellulose xanthate and said coloring agent is a cellulose dye.

12. A cellulosic meat casing coated or imprinted with a composition as defined in claim 1.

References Cited

UNITED STATES PATENTS

| | | | |
|---|---|---|---|
| 1,379,351 | 5/1921 | Lilienfield | 106—164 XR |
| 2,296,857 | 9/1942 | Lilienfield | 106—164 XR |
| 2,335,126 | 11/1943 | Lilienfield | 106—203 XR |
| 2,772,175 | 11/1956 | Beatty et al. | 106—26 |
| 2,884,331 | 4/1959 | Locker et al. | 106—26 |
| 2,884,332 | 4/1959 | Locker et al. | 106—26 XR |
| 3,083,118 | 3/1963 | Bridgeford. | |
| 3,291,789 | 12/1966 | Bridgeford | 117—144 XR |
| 3,336,144 | 8/1967 | Bridgeford et al. | 106—164 |
| 3,399,069 | 8/1968 | Bridgeford | 106—164 |
| 3,245,810 | 4/1966 | Heiss et al. | 106—27 |

JULIUS FROME, Primary Examiner

J. B. EVANS, Assistant Examiner

U.S. Cl. X.R.

106—164, 193, 204; 117—144; 260—217